2,694,069

Patented Nov. 9, 1954

2,694,069

BASIC ESTERS OF HYDROXY- AND ALKOXY-SUBSTITUTED PHENYLOXOALKENOIC ACIDS AND THEIR SALTS

George M. Picha, Skokie, Ill., assignor to G. D. Searle & Co., Chicago, Ill., a corporation of Illinois No Drawing. Application October 24, 1952,
Serial No. 316,800

14 Claims. (Cl. 260—294.3)

The present invention relates to a new group of esters of unsaturated acids and more particularly to the basic esters of hydroxy- and alkoxy-substituted phenyloxoalkenoic acids and their salts. These esters can be represented by the structural formula

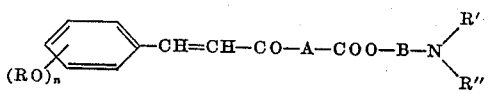

wherein A and B are lower saturated, bivalent hydrocarbon radicals containing at least two carbon atoms, $n$ is either one or two, R is either hydrogen or a lower alkyl radical, and NR'R'' is a basic group of the class consisting of lower dialkylamino radicals and nitrogen-containing heterocyclic radicals attached through a nitrogen in the heterocycle to the radical B.

In the foregoing structural formula A and B are bivalent saturated aliphatic hydrocarbon radicals of from two to eight carbon atoms. Such radicals are derived from straight chained or branch chained aliphatic hydrocarbon radicals such as ethylene, propylene, butylene, amylene, or the polymethylene radicals such as trimethylene, tetramethylene, pentamethylene and hexamethylene. It is necessary, howver, that the radical —COO— be separated from the radical —CO— and from the nitrogen atom by at least two carbon atoms, since the β-keto acid derivatives, wherein A would be methylene, and the α-aminomethyl esters wherein B would be methylene, have different properties. R can be either hydrogen or a lower alkyl radical such as methyl, ethyl, propyl and the like.

Among the radicals which R' and R'' represent are such lower alkyl groups as methyl, ethyl, propyl, butyl, amyl and hexyl, wherein the propyl, butyl, amyl and hexyl groups may be either of the straight-chain or branch-chain type. The radical NR'R'' can also be a nitrogen-containing lower heterocycle such as piperazine, N'-alkyl-piperazine, thiamorpholine, quinoline and isoquinoline, but of particular interest are the heterocyclic radicals of the type

wherein Z is either an ethyleneoxyethylene radical, as in the case of morpholine, or an alkylene chain of four to seven carbon atoms, four to five of which are in nuclear position, as in the case of pyrrolidine, piperidine, 2,5-dimethylpyrrolidine and 2,6-lupetidine.

The organic bases of the foregoing type form non-toxic salts with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, iso-butyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds which constitute this invention are valuable as intermediates in organic synthesis. These esters are active as hormonal and antihormonal agents, especially as antagonists of desoxycorticosterone. They also have a pronounced effect on metabolism and are active in lowering hypertensive blood levels. I have further found that these compounds, with the exception of the morpholine derivatives, are useful as indicators giving extremely sensitive yellow color reactions upon a slight increase of the pH. Thus a solution of 5 milligrams of the hydrochloride of the diethylaminoethyl ester of 7-p-hydroxyphenyl-5-oxo-6-heptenoic acid in 5 milliliters of distilled water gives a yellow color on addition of 5 micrograms of potassium bicarbonate.

The acids which constitute the starting materials for the esters of my invention are prepared by the alkaline condensation of a substituted benzaldehyde of the type

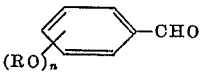

with a keto acid of the type $$CH_3—CO—A—COOH$$

all symbols being defined as hereinabove. From these acids simple alkyl esters and basically substituted alkyl esters are prepared in the usual manner.

My invention will appear more fully from the following experimental part. It will be understood, however, that these examples are set forth by way of illustration only, and that the invention is not to be construed as limited in spirit or in scope by the details contained therein. It will be apparent to those skilled in the art that many modifications in materials and methods can be made without departing from the scope of the invention. In each of the examples temperatures are given in degrees centigrade (° C.) and quantities in parts by weight.

Example 1

A solution of 35 parts of levulinic acid, 30 parts of p-hydroxybenzaldehyde, 36 parts of sodium hydroxide and 600 parts of water is heated on a steam bath for 3 hours and allowed to stand at room temperature for 18 hours. It is then added, with stirring, to an excess of dilute hydrochloric acid. A thick brown oil precipitates which shows a slight tendency toward crystallization upon standing for several hours. The gummy product is collected and suspended in 100 parts of 40% ethanol. This suspension is cooled to about —10° C. and upon completion of the crystallization, the product is collected on a filter and washed with cold, dilute ethanol. Three recrystallizations from dilute ethanol yield grayish-white plates of 6-(p-hydroxyphenyl)-4-oxo-5-hexenoic acid which melt at about 146–147° C.

Example 2

To a solution of 28 parts of 6-(p-hydroxyphenyl)-4-oxo-5-hexenoic acid in 80 parts of isopropanol, a solution of 18 parts of β-chloroethyldiethylamine in 80 parts of isopropanol is gradually added, and the reaction mixture is heated under reflux for 7 hours. A small amount of insoluble residue forms which is removed by filtration from the hot solution. The filtrate is concentrated and cooled and the crude crystalline hydrochloride which separates is collected on a filter. Three recrystallizations from a mixture of methanol and isopropanol yield glistening white crystals of the pure hydrochloride of the diethylaminoethyl ester of 6-(p-hydroxyphenyl)-4-oxo-5-hexenoic acid which melt at about 142–143° C. The salt has the structural formula

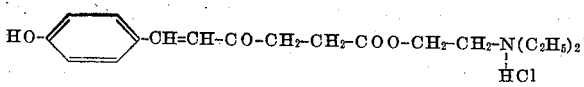

Example 3

A solution of 444 parts of 6-(p-hydroxyphenyl)-4-oxo-5-hexenoic acid in 4000 parts of isopropanol is treated by gradual addition with 313 parts of freshly distilled 1-(β-chloroethyl)piperidine and heated under reflux for 5 hours. The reaction mixture is evaporated to dryness, extracted with water and filtered from a small amount of insoluble residue. The filtrate is rendered alkaline by addition of 5% potassium bicarbonate solution, chilled and extracted with ether. This extract is washed repeatedly with water, dried over anhydrous calcium sulfate and filtered. The ether solution is treated with a slight excess of anhydrous hydrogen chloride whereupon the white hydrochloride of the piperidinoethyl ester of 6-(p-hydroxyphenyl)-4-oxo-5-hexenoic acid precipitates which, recrystallized from methanol, melts at about 170–171° C. The salt has the structural formula

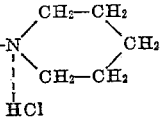

Example 4

A solution of 13 parts of 5-oxocaproic acid, 11 parts of salicylaldehyde, 12 parts of sodium hydroxide and 200 parts of water is heated on the steam bath for 2 hours and then chilled in an ice bath. The reaction mixture is acidified to about pH 5 by the gradual addition of dilute hydrochloric acid. An excess of mineral acid is to be avoided. The crude, amorphous 7-(o-hydroxyphenyl)-5-oxo-6-heptenoic acid is washed well with water and dried.

Example 5

A solution of 93 parts of 5-oxocaproic acid, 79 parts of m-hydroxybenzaldehyde, 86 parts of sodium hydroxide and 1400 parts of water is heated on the steam bath for one hour. The reaction mixture is then cooled and added to an excess of dilute hydrochloric acid. The 7-(m-hydroxyphenyl)-5-oxo-6-heptenoic acid is obtained as an oil which is washed, decanted and dried in vacuum.

Example 6

A solution of 26 parts of 5-oxocaproic acid, 22 parts of p-hydroxybenzaldehyde, 24 parts of sodium hydroxide and 400 parts of water is heated on the steam bath for 4 hours and permitted to stand at room temperature for 18 hours. The reaction mixture is then added, with stirring, to an excess of dilute hydrochloric acid. A pale tan, granular condensation product precipitates and is collected on a filter. Repeated crystallization from 95% ethanol yields pale yellow crystals of 7-(p-hydroxyphenyl)-5-oxo-6-heptenoic acid which melt at about 193–194.5° C.

Example 7

A suspension of 50 parts of 7-(p-hydroxyphenyl)-5-oxo-6-heptenoic acid and 28 parts of freshly distilled β-chloroethyldimethylamine in 320 parts of isopropanol is heated under reflux for about 5 hours. The purification procedure is made somewhat difficult because of an unusually large amount of formation of the dimer of the β-chloroethyldimethylamine. The insoluble residue is removed by filtration and the filtrate evaporated to dryness. The solid residue is digested with 500 parts of water and the insoluble material, consisting of unreacted acid, is discarded. The aqueous solution is evaporated to dryness and the residue is recrystallized several times from isopropanol to give somewhat impure grayish-white crystals of the hydrochloride of the dimethylaminoethyl ester of 7-(p-hydroxyphenyl)-5-oxo-6-heptenoic acid. The product is further purified in the following manner. An aqueous solution of the mixture is rendered alkaline by addition of 5% aqueous potassium bicarbonate solution and extracted with ether. The ether extract is washed with water, dried over anhydrous calcium sulfate and filtered. The filtrate is treated with a slight excess of anhydrous hydrogen chloride and the resulting precipitate is collected on a filter and recrystallized from a mixture of methanol and isopropanol. The product melts fairly sharply at about 166–168° C. It has the structural formula

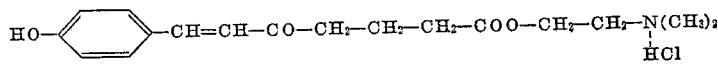

Example 8

A suspension prepared from 56.7 parts of 7-(p-hydroxyphenyl)-5-oxo-6-heptenoic acid and 80 parts of hot isopropanol is treated by the dropwise addition of 32.8 parts of β-chloroethyldiethylamine in 160 parts of isopropanol and the reaction mixture is heated under reflux for about 5 hours. A small amount of an insoluble residue, presumably the dimer of the amine, is removed by filtration, and the filtrate is cooled. The crystalline product is collected and recrystallized repeatedly from a mixture of methanol and isopropanol to yield the white hydrochloride of the diethylaminoethyl ester of 7-(p-hydroxyphenyl)-5-oxo-6-heptenoic acid. The salt begins to sinter at about 150° C. and melts at about 152–154° C. It has the structural formula

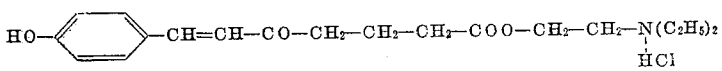

Example 9

A suspension of 57.2 parts of 7-(p-hydroxyphenyl)-5-oxo-6-heptenoic acid in 420 parts of hot isopropanol is treated by gradual addition of 37.8 parts of freshly distilled 1-(β-chloroethyl)piperidine, and the reaction mixture is heated at reflux temperature for 6 hours. The reaction mixture is then evaporated to dryness, extracted with water and filtered from an insoluble precipitate. The filtrate is rendered alkaline by addition of a 5% potassium bicarbonate solution, cooled and ether extracted. This extract is washed with water, dried over anhydrous calcium sulfate and filtered. The filtrate is treated with slightly more than one equivalent of anhydrous hydrogen chloride and the resulting precipitate is collected on a filter and recrystallized from a mixture of methanol and isopropanol. The hydrochloride of the β-piperidinoethyl ester of 7-(p-hydroxyphenyl)-5-oxo-6-heptenoic acid melts at about 169–170.5° C.

Example 10

A suspension prepared from 21.2 parts of 7-(p-hydroxyphenyl)-5-oxo-6-heptenoic acid, 14.2 parts of 1-(β-chloroethyl)morpholine, and 200 parts of isopropanol is heated under reflux for about 6 hours. A small amount of insoluble residue is removed by filtration and the clear filtrate is concentrated to about 150 parts and allowed to cool. The crude hydrochloride which separates from the solution is collected on a filter and then an additional crop is collected upon dilution of the mother liquor with ether. Repeated recrystallization of the combined crude fractions from a mixture of methanol and isopropanol yields almost white crystals of the pure hydrochloride of the morpholinoethyl ester of 7-(p-hydroxyphenyl)-5-oxo-6-heptenoic acid which melt at about 203–205° C. after very slight preliminary softening. The salt has the structural formula

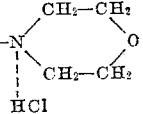

Example 11

A suspension prepared from 6.4 parts of 7-(o-hydroxyphenyl)-5-oxo-6-heptenoic acid and 20 parts of hot isopropanol is treated by the dropwise addition of 4.7 parts of 1-(β-chloroethyl)-2,6-lupetidine in 20 parts of isopropanol and the reaction mixture is heated under reflux for 7 hours. The warm esterification mixture is filtered from an insoluble residue and the filtrate is concentrated and chilled. The precipitated hydrochloride is collected on a filter and dissolved in water. The aqueous solution is rendered alkaline by the addition of dilute sodium bicarbonate and extracted with ether. The ether extract is dried over anhydrous calcium sulfate, stirred with charcoal, filtered and evaporated. There remains a colorless residue which consists of the β-lupetidinoethyl ester of 7-(o-hydroxyphenyl)-5-oxo-6-heptenoic acid and has the structural formula

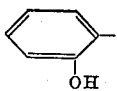—CH=CH—CO—CH₂—CH₂—CH₂—COO—CH₂—CH₂—N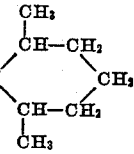

*Example 12*

A suspension prepared from 63 parts of 7-(m-hydroxyphenyl)-5-oxo-6-heptenoic acid and 100 parts of hot isopropanol is treated by the dropwise addition of 40 parts of 1-(γ-chloropropyl)pyrrolidine in 200 parts of isopropanol. The reaction mixture is heated under reflux for 6 hours and then filtered. The filtrate is concentrated and chilled. The precipitated hydrochloride is separated by decantation. An aqueous solution of this salt is rendered alkaline by the addition of dilute potassium bicarbonate and extracted with ether. The ether extract is dried over anhydrous calcium sulfate, stirred with decolorizing charcoal and filtered. Upon evaporation the pyrrolidinopropyl ester of 7-(m-hydroxyphenyl)-5-oxo-6-heptenoic acid is obtained as a gum which has structural formula

—CH=CH—CO—CH₂—CH₂—CH₂—COO—CH₂—CH₂—CH₂—N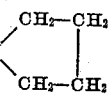

*Example 13*

A solution prepared from 175 parts of 6-oxo-heptenoic acid, 130 parts of p-hydroxybenzaldehyde, 150 parts of sodium hydroxide and 2500 parts of water is heated on a steam bath for 3.5 hours and then allowed to stand at room temperature for 18 hours. The reaction mixture is then substantially free of unreacted p-hydroxybenzaldehyde as demonstrated by the fact that on treatment with an excess of carbon dioxide gas only a negligible amount of precipitate is formed. Such precipitate is removed by filtration and the filtrate is added, with stirring, to an excess of dilute hydrochloric acid. An insoluble gum is formed which is washed by decantation. The gum is covered with about 300 parts of ethanol and the semi-crystalline suspension, which gradually forms, is chilled to about −20° C. Upon completion of the crystallization the product is collected on a filter and washed rapidly with a small quantity of ethanol. Recrystallization from ethanol yields at once yellow crystals of 8-(p-hydroxyphenyl)-6-oxo-7-octenoic acid which melt at about 151–152° C.

*Example 14*

To a suspension of 27.3 parts of 8-(p-hydroxyphenyl)-6-oxo-7-octenoic acid acid in 80 parts of warm isopropanol, a solution of 16 parts of β-chloroethyldiethylamine in 80 parts of isopropanol is added. The acid quickly enters into solution as the base is added. The reaction mixture is heated under reflux for about 6 hours and then filtered to remove a small amount of insoluble material. Upon cooling of the filtrate the hydrochloride of the diethylaminoethyl ester of 8-(p-hydroxyphenyl)-6-oxo-7-octenoic acid precipitates. After three successive recrystallizations from isopropanol, almost white crystals are obtained which melt at about 137–139° C. The compound has the structural formula HO—⟨ ⟩—CH=CH—CO—CH₂—CH₂—CH₂—CH₂—COO—CH₂—CH₂—N(C₂H₅)₂
·HCl

*Example 15*

To a solution of 27.9 parts of 8-(p-hydroxyphenyl)-6-oxo-7-octenoic acid in 240 parts of hot isopropanol, 17.4 parts of 1-(β-chloroethyl)piperidine are added and the mixture is heated at reflux temperature for 8 hours. It is then evaporated to dryness and extracted with water. The extract is rendered alkaline by addition of 5% aqueous potassium bicarbonate solution, chilled and extracted with ether. This ether extract is washed with water, dried over anhydrous calcium sulfate, filtered and treated with a slight excess of anhydrous hydrogen chloride. The resulting precipitate is collected on a filter and recrystallized from a mixture of methanol and isopropanol. The hydrochloride of the piperidinoethyl ester of 8-(p-hydroxyphenyl)-6-oxo-7-octenoic acid thus obtained melts at about 187–188° C.

*Example 16*

A solution prepared from 19.3 parts of 3,3-dimethyl-5-oxocaproic acid, 14.7 parts of o,p-dihydroxybenzaldehyde, 15 parts of sodium hydroxide and 250 parts of water is heated on a steam bath for 2 hours and then allowed to stand at room temperature for 18 hours. The reaction mixture is filtered from a small amount of residue and poured into a stirred solution of an excess of dilute hydrochloric acid. An insoluble resinous mass precipitates which is washed with water and then suspended in ethanol and chilled to about −10° C. The precipitate is collected on a filter and washed with a small amount of ethanol. Upon recrystallization from ethanol yellowish 3,3-dimethyl-7-(o,p-dihydroxyphenyl)-5-oxo-6-heptenoic acid is obtained.

*Example 17*

A suspension is prepared from 3.17 parts of 3,3-dimethyl-7-(o,p-dihydroxyphenyl)-5-oxo-6-heptenoic acid and 10 parts of warm isopropanol and treated with a solution of 2 parts of β-chloroethyldiisopropylamine in 10 parts of isopropanol. The resulting solution is heated under reflux for 5 hours and then filtered while hot. The filtrate is chilled and the precipitated hydrochloride recrystallized repeatedly from isopropanol and then dried. Whitish crystals are thus obtained which have the structural formula

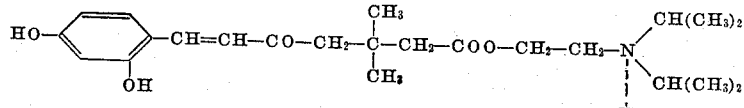

*Example 18*

A solution of 51 parts of 7-oxooctanoic acid, 35 parts of p-hydroxybenzaldehyde, 40 parts of sodium hydroxide and 650 parts of water is heated on a steam bath for 4 hours, and allowed to stand overnight at room temperature for 18 hours. The reaction mixture is filtered from a slight residue and the filtrate is added dropwise with constant stirring to an excess of dilute hydrochloric acid. The crude gummy product is washed by decantation with water and recrystallized repeatedly from dilute ethanol. The resulting dense white crystals of the pure 9-(p-hydroxyphenyl)-7-oxo-8-nonenoic acid melt at about 133–135° C.

*Example 19*

To a solution of 100 parts of 9-(p-hydroxyphenyl)-7-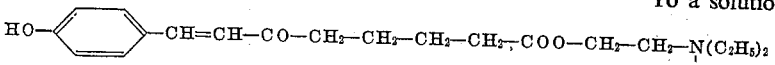
·HCl oxo-8-nonenoic acid in 480 parts of hot isopropanol 56 parts of β-chloroethyldiethylamine are gradually added. After heating at reflux temperature for 7 hours the reaction mixture is concentrated under vacuum to dryness and extracted with water. The aqueous extract is rendered alkaline by addition of 5% potassium bicarbonate solution, chilled and extracted with ether. This ether extract is washed with water, dried over anhydrous calcium sulfate and filtered. The hydrochloride of the resulting diethylaminoethyl ester of 9-(p-hydroxyphenyl)-7-oxo-8-nonenoic acid, recrystallized from a mixture of methanol and isopropanol, melts at about 124–125° C.

*Example 20*

A solution of 40 parts of 9-(p-hydroxyphenyl)-7-oxo-8-nonenoic acid and 320 parts of isopropanol is treated by the gradual addition of 24 parts of 1-(β-chloroethyl)piperidine and heated at reflux temperature for 8 hours. The reaction mixture is then evaporated under vacuum and the residue is extracted with water. This extract is rendered alkaline by addition of 5% potassium carbonate solution, cooled and extracted with ether. The ether extract is washed with water, dried over anhydrous calcium sulfate, filtered and treated with slightly more than one equivalent of anhydrous hydrogen chloride. The resulting white precipitate of the hydrochloride of the piperidinoethyl ester of 9-(p-hydroxyphenyl)-7-oxo-8-nonenoic acid is recrystallized from a mixture of methanol and isopropanol. The white crystals melt at about 142–144° C. The compound has the structural formula

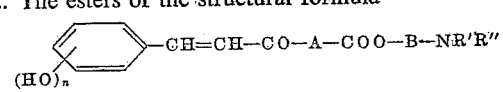

*Example 21*

A mixture of 12 parts of 5-oxocaproic acid, 15 parts of anisaldehyde, 8 parts of sodium hydroxide and 300 parts of water is heated on a steam bath with vigorous stirring for 30 minutes. The reaction mixture is then transferred to a separatory funnel and washed repeatedly with benzene. The benzene extracts are discarded and the aqueous solution is added to dilute hydrochloric acid whereupon an oily product precipitates. By crystallization from dilute ethanol there are obtained almost white and slightly gummy crystals of 7-(p-methoxyphenyl)-5-oxo-6-heptenoic acid.

*Example 22*

21 parts of 7-(p-hydroxyphenyl)-5-oxo-6-heptenoic acid in 200 parts of water containing 20 parts of sodium hydroxide are treated by the dropwise addition of dimethyl sulfate to the first appearance of a precipitate. The mixture is then diluted with 200 parts of water, and small additional quantities of sodium hydroxide and dimethyl sulfate are added to insure a complete reaction. An anise-like odor is easily detectable in the reaction mixture, and probably represents products of partial decomposition. At the conclusion of the reaction the basic solution is acidified with dilute hydrochloric acid, and the oil which precipitates is recrystallized from dilute ethanol. The 7-(p-methoxyphenyl)-5-oxo-6-heptenoic acid is identical with the product of the previous example.

*Example 23*

A suspension of 10 parts of 7-(p-methoxyphenyl)-5-oxo-6-heptenoic acid, 10 parts of γ-chloropropyldipropylamine and 100 parts of isopropanol is heated under reflux for about 6 hours. The resulting mixture is filtered while hot and then cooled. The crude hydrochloride is dissolved in water, rendered alkaline by the addition of potassium bicarbonate and extracted with ether. The ether extract is dried over anhydrous calcium sulfate, stirred with decolorizing charcoal, filtered and evaporated. The light yellow, oily residue is the γ-dipropylaminopropyl ester of 7-(p-methoxyphenyl)-5-oxo-6-heptenoic acid. A white crystalline hydrobromide is obtained by treatment with an isopropanol solution of one equivalent of hydrogen bromide and repeated crystallization from isopropanol. It has the structural formula

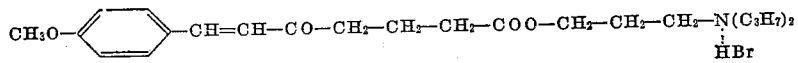

I claim:
1. A member of the class consisting of the bases of the structural formula

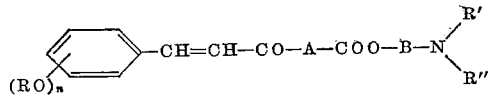

and the non-toxic acid-addition salts thereof, wherein A is a lower alkylene radical separating the —CO— and —COO— radicals by at least two carbon atoms, B is a lower alkylene radical separating the —COO— radical and the nitrogen atom by at least two carbon atoms, n is a positive integer less than three, R is a member of the class consisting of hydrogen and lower alkyl radicals, and NR'R" is a member of the class consisting of lower dialkylamino radicals, morpholino radicals and radicals wherein R' and R" are combined to form a lower alkylene radical of four to seven carbon atoms containing four to five carbon atoms in the ring.

2. The esters of the structural formula

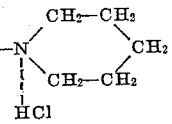

wherein A is a lower alkylene radical separating the —CO— and —COO— radicals by at least two carbon atoms, B is a lower alkylene radical separating the —COO—radical and the nitrogen atom by at least two carbon atoms, n is a positive integer less than three and R' and R" are lower alkyl radicals.

3. The esters of the structural formula

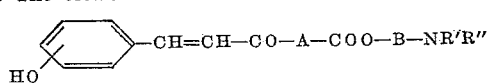

wherein A is a lower alkylene radical separating the —CO— and —COO— radicals by at least two carbon atoms. B is a lower alkylene radical separating the —COO— radical and the nitrogen atom by at least two carbon atoms and R' and R" are lower alkyl radicals.

4. The esters of the structural formula

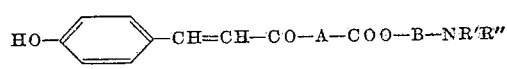

wherein A is a lower alkylene radical separating the —CO— and —COO— radicals by at least two carbon atoms, B is a lower alkylene radical separating the —COO— radical and the nitrogen atom by at least two carbon atoms, and R' and R" are lower alkyl radicals.

5. The esters of the structural formula

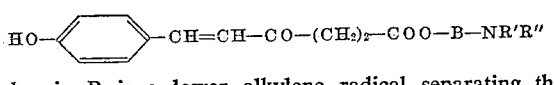

wherein B is a lower alkylene radical separating the —COO— radical and the nitrogen atom by at least two carbon atoms and R' and R" are lower alkyl radicals.

6. The esters of the structural formula

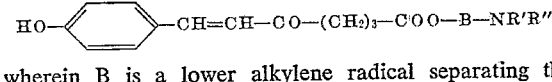

wherein B is a lower alkylene radical separating the —COO— radical and the nitrogen atom by at least two carbon atoms and R' and R" are lower alkyl radicals.

7. The esters of the structural formula

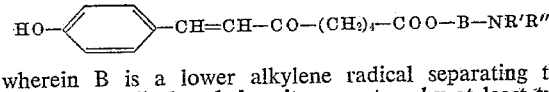

wherein B is a lower alkylene radical separating the —COO— radical and the nitrogen atom by at least two carbon atoms and R' and R" are lower alkyl radicals.

8. The esters of the structural formula

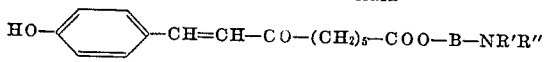

wherein B is a lower alkylene radical separating the —COO— radical and the nitrogen atom by at least two carbon atoms and R' and R" are lower alkyl radicals.

9. The esters of the structural formula

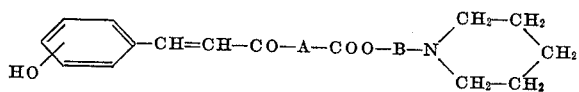

wherein A is a lower alkylene radical separating the —CO— and —COO— radicals by at least two carbon atoms, and B is a lower alkylene radical separating the —COO— radical and the nitrogen atom by at least two carbon atoms.

10. The esters of the structural formula

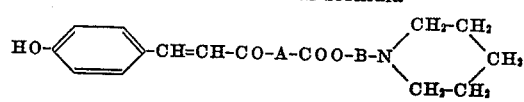

wherein A is a lower alkylene radical separating the —CO— and —COO— radicals by at least two carbon atoms, and B is a lower alkylene radical separating the —COO— radical and the nitrogen atom by at least two carbon atoms.

11. Diethylaminoethyl ester of 6-(p-hydroxyphenyl)-4-oxo-5-hexenoic acid.

12. Diethylaminoethyl ester of 7-(p-hydroxyphenyl)-5-oxo-6-heptenoic acid.

13. Diethylaminoethyl ester of 8-(p-hydroxyphenyl)-6-oxo-7-octenoic acid.

14. Diethylaminoethyl ester of 9-(p-hydroxyphenyl)-7-oxo-8-nonenoic acid.

References Cited in the file of this patent

UNITED STATES PATENTS

| Number | Name | Date |
|---|---|---|
| 2,310,973 | Lott | Feb. 16, 1943 |
| 2,589,224 | Burtner | Mar. 18, 1952 |